V. LOCK.
RESILIENT TIRE.
APPLICATION FILED DEC. 14, 1915.
1,234,048.
Patented July 17, 1917.
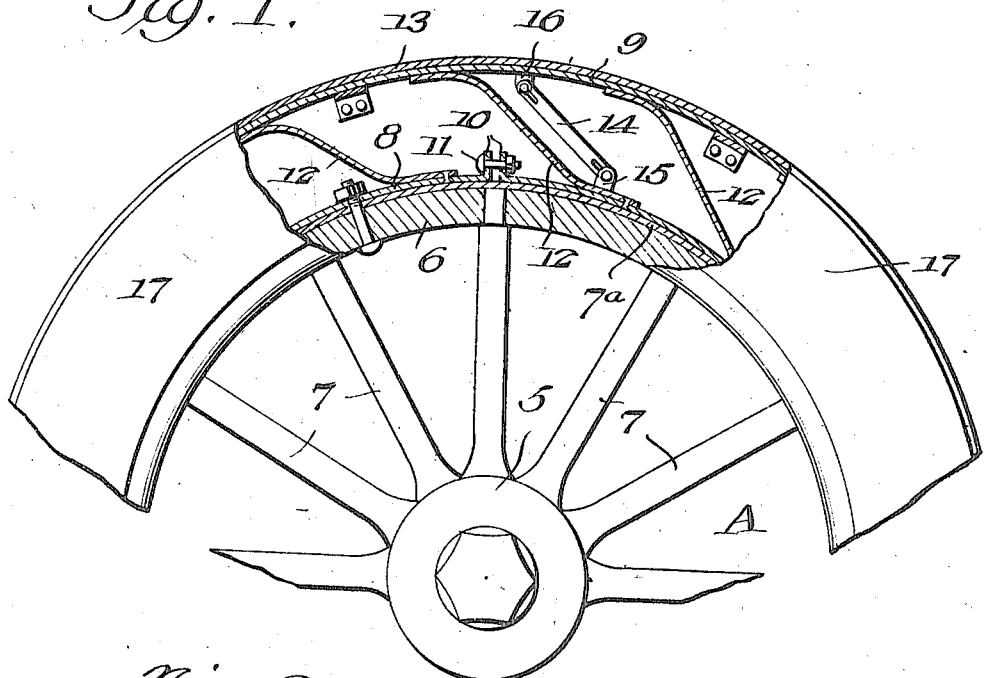
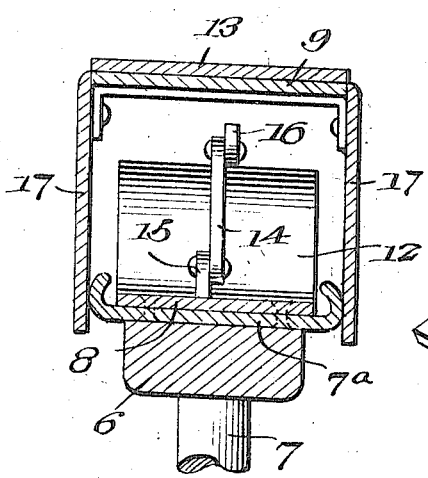
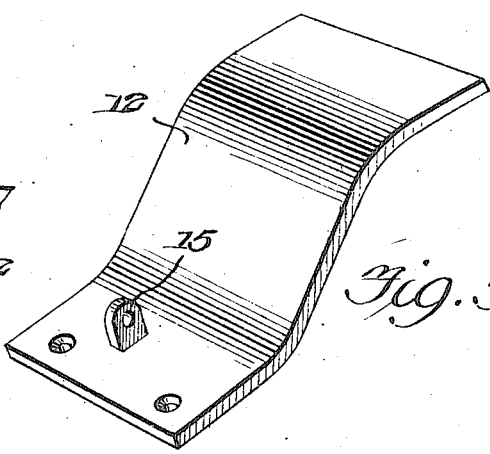
Witnesses
Hugh H. Lee
Edward Frazer
Inventor
Vernie Lock
By Victor J. Evans
Attorney

UNITED STATES PATENT OFFICE.

VERNIE LOCK, OF CHANUTE, KANSAS.

RESILIENT TIRE.

1,234,048.  Specification of Letters Patent.  Patented July 17, 1917.

Application filed December 14, 1915. Serial No. 66,783.

*To all whom it may concern:*

Be it known that I, VERNIE LOCK, a citizen of the United States, residing at Chanute, in the county of Neosho and State of Kansas, have invented new and useful Improvements in Resilient Tires, of which the following is a specification.

This invention contemplates the provision of a metallic resilient tire, capable of being quickly and easily mounted upon the rim of the wheel subsequent to the removal of the ordinary pneumatic tire therefrom, and by reason of which fact it is especially advantageous as an emergency tire.

The invention resides in the construction, combination and arrangement of parts as claimed, which produce a puncture-proof tire possessing a high degree of resiliency and all the advantages of the pneumatic tire, and at the same time eliminating considerable trouble resulting from punctures and blow-outs resultant from the use of the pneumatic tire.

In the drawing forming part of this specification, like numerals of reference indicate similar parts in the several views and wherein:—

Figure 1 is a fragmental side elevation.

Fig. 2 is a transverse sectional view through a portion of the tire.

Fig. 3 is a perspective view of one of the springs.

Referring more particularly to the drawing A indicates generally a wheel of usual construction, embodying a hub 5 and felly 6 which are connected by means of the spokes 7. Mounted upon the felly 6 and secured thereto in any suitable manner is a clencher rim 7ª which may be of any ordinary well known construction.

In carrying out my invention I make use of spaced concentrically disposed resilient bands 8 and 9 respectively, which may be constructed from any suitable material. The respective bands are of different widths, while the inner band is of a width slightly greater than that of the felly 6 and disposed concentrically of the rim 7ª, engaging the latter and having its opposite edges extended within the channels defined by the rim. The band 8 is split as shown, and has its adjacent ends formed to provide the lugs 10, adapted to be arranged in confronting relation and connected by means of a fastening element 11. Manifestly by reason of this construction, it will be noted that the band 8 can be quickly associated with the rim 7 subsequent to the removal of the ordinary pneumatic tire (not shown).

Interposed between the bands 8 and 9 respectively is a plurality of springs 12 providing a yieldable means for absorbing the shock of the vehicle incident to its travel over irregular surfaces. These springs may be of any formation and construction, but as shown in this particular instance I employ the flat springs illustrated, which have one end riveted or otherwise secured to the periphery of the band 8 and disposed tangentially with respect thereto. Any number of springs may be employed, it being desired however to have the free end of each spring that normally contacts the inner periphery of the outer band 9, to extend beyond the fixed end of the adjacent spring, which arrangement provides for the maximum resiliency of a tire of this construction. Surrounding the outer band 9 and secured thereto in any suitable manner is a casing or tread 13 which may be constructed of any material found suitable for the purpose, but preferably consists of a band of leather.

With a view of limiting circumferential movement of the outer band 9 with respect to the inner band 8, I provide an arm or link 14 which has one end pivotally connected to a lug 15 secured to certain of the springs 12, while the opposite end of the arm is pivotally associated with a similar lug 16 secured to the inner periphery of the outer band 9. In addition to limiting circumferential movement of the band 9 as hereinabove stated, the link 14 by reason of its pivotal connection permits of the proper resilient action of the tire under all conditions.

Arranged at the opposite sides of the tire, and secured to the outer band 9 in any suitable manner are the plates 17 which are adapted to wholly cover the springs 12, and project a slight distance beyond the rim 7 to prevent dirt, dust or other foreign matter from entering the tire between the bands 8 and 9 respectively which would obviously affect the efficiency of the tire. It is of course to be understood that one of these plates is detachably associated with the outer band 9 to facilitate the application of the tire upon the rim or its removal therefrom when desired. By removal of one of the plates 17 access may be had to the fastening element connecting the adjacent ends of the inner band 8, by reason of which fact it will be obvious that the tire can be quickly and easily mounted upon the rim subsequent to the removal of the ordinary pneumatic tire, and in this respect will prove very serviceable as an emergency tire.

It is believed that from the foregoing description the nature and advantages of the invention will be understood without requiring a more extended explanation. However I desire to have it understood that I do not limit myself to the precise construction and arrangement of parts herein shown and described as various changes may be resorted to when desired as fall within the scope of the appended claim.

What is claimed is:—

A resilient tire for wheels comprising in combination a channel rim, a band disposed concentrically of said rim and secured thereto, a second band disposed in spaced concentric relation with the first mentioned band, leaf springs interposed between said bands at spaced intervals, said springs being curved longitudinally whereby the opposite extremities of each spring are disposed substantially in parallelism to contact said bands, a lug depending from the second mentioned band adjacent certain of said springs, a lug projecting from certain of said springs at an appropriate point in its length, and in alinement with the longitudinal center of the springs, said lugs being disposed one in advance of the other, an arm having its extremities pivotally associated with said lugs to limit circumferential movement of the second mentioned band with respect to the rim, and side plates depending from the second mentioned band and terminating below said rim for housing said parts.

In testimony whereof I affix my signature in presence of two witnesses.

VERNIE LOCK.

Witnesses:
H. O. LOCK,
W. H. FELD.

Copies of this patent may be obtained for five cents each, by addressing the "Commissioner of Patents, Washington, D. C."